US012497840B1

(12) United States Patent
Warwick et al.

(10) Patent No.: US 12,497,840 B1
(45) Date of Patent: Dec. 16, 2025

(54) METHOD OF THERMAL ASSEMBLY OF LEG-CONE ASSEMBLIES INTO A ROTATING CONE DRILL BIT BODY

(71) Applicant: Salvation Drilling Tools, LLC, San Bernardino, CA (US)

(72) Inventors: Gary Warwick, San Bernardino, CA (US); Phillip Canipe, La Quinta, CA (US)

(73) Assignee: Salvation Drilling Tools, LLC, San Bernardino, CA (US)

( * ) Notice: Subject to any disclaimer, the term of this patent is extended or adjusted under 35 U.S.C. 154(b) by 179 days.

(21) Appl. No.: 18/399,489

(22) Filed: Dec. 28, 2023

Related U.S. Application Data

(60) Provisional application No. 63/436,520, filed on Dec. 31, 2022.

(51) Int. Cl.
*E21B 10/18* (2006.01)
*B23P 15/28* (2006.01)
*E21B 10/22* (2006.01)

(52) U.S. Cl.
CPC .............. *E21B 10/22* (2013.01); *B23P 15/28* (2013.01); *E21B 10/18* (2013.01)

(58) Field of Classification Search
CPC ........... E21B 10/22; E21B 10/18; B23P 15/28
See application file for complete search history.

(56) References Cited

U.S. PATENT DOCUMENTS

| | | | | |
|---|---|---|---|---|
| 1,983,316 | A | 12/1934 | Scott et al. | |
| 4,417,629 | A * | 11/1983 | Wallace | B23P 15/28 175/356 |
| 4,452,325 | A * | 6/1984 | Radd | E21B 10/5676 76/108.4 |
| 4,562,892 | A * | 1/1986 | Ecer | E21B 10/52 175/425 |
| 4,572,306 | A * | 2/1986 | Dorosz | E21B 10/22 175/371 |
| 4,711,143 | A * | 12/1987 | Loukanis | B23P 15/28 175/413 |
| 6,053,264 | A * | 4/2000 | Frankel | E21B 10/20 175/371 |
| 8,201,646 | B2 | 6/2012 | Vezirian | |
| 8,439,134 | B2 | 5/2013 | Vezirian | |
| 8,601,908 | B2 | 12/2013 | Vezirian | |
| 9,004,198 | B2 * | 4/2015 | Kulkarni | E21B 10/22 175/371 |
| 9,523,386 | B1 * | 12/2016 | Gonzalez | E21B 23/0419 |
| 12,297,698 | B2 * | 5/2025 | Suresh | E21B 10/24 |

* cited by examiner

*Primary Examiner* — Omar Flores Sanchez

(74) *Attorney, Agent, or Firm* — Master Key IP, LLP; Jeromye V. Sartain

(57) ABSTRACT

A method of thermal assembly of multiple leg-cone assemblies within multiple respective distally-opening leg bores of a drill bit body of a rotating cone drill bit, each leg-cone assembly having a leg body with a proximal leg shank for selective receipt within the respective leg bore, the method including the steps of (a) forming a pocket in the drill bit body symmetrically about the leg bores, (b) heating a single leg bore, (c) inserting the leg shank of the leg-cone assembly into the heated leg bore, (d) cooling the drill bit, and (e) repeating steps (b)-(d) in separately assembling each leg-cone assembly within the respective leg bore, thereby mitigating against adverse thermal effects on seals or grease within the leg-cone assemblies.

20 Claims, 8 Drawing Sheets

METHOD OF THERMAL ASSEMBLY OF LEG-CONE ASSEMBLIES INTO A ROTATING CONE DRILL BIT BODY

RELATED APPLICATIONS

This non-provisional patent application claims priority pursuant to 35 U.S.C. § 119(e) to and is entitled to the filing date of U.S. Provisional Patent Application Ser. No. 63/436,520 filed Dec. 31, 2022, and entitled "Method of Thermal Assembly of Leg-Cone Assemblies into a Rotating Cone Drill Bit Body." The contents of the aforementioned application are incorporated herein by reference.

BACKGROUND

The subject of this patent application relates generally to three-cone rotary drill bits, and more particularly to a method of thermal assembly of leg-cone assemblies into a rotating cone drill bit body.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference and to the same extent as if the contents of such publication were expressly recited herein. Where a definition or use of a term in an incorporated reference is inconsistent or contrary to the definition of that term provided herein, the definition of that term provided herein applies and the definition of that term in the reference does not apply.

By way of background, many innovations have been developed over the years related to earth drilling such as for oil well drilling, from early mechanical solutions regarding drill strings and related casings for wells of various depths to more recent measurement-while-drilling ("MWD") technologies that enable real-time feedback regarding drilling status and even drill steering to allow the well to change direction, thereby even supporting to horizontal drilling to better address a reservoir's location and shape and even avoid adversely affecting environmentally sensitive and protected lands above.

One of the key and earliest earth or well drilling innovations was the rotary drill, first used in the 1880's. Such a rotating drill bit generally involves a drill string having axially interconnected sections of drill pipe that is supported and driven at its upper end by a swivel and turntable and has the actual rotating drill bit at its lower end for cutting or boring into the earth, with related systems ranging from diesel and electrical power generation to a mechanical hoist to circulating pumps and pipes for providing mud to the working or drill bit end of the string that is then pumped or pushed back up and out of the hole and carries rock cuttings to the surface with it. An early example of such a three-cone rotary drill bit or rock bit is shown in U.S. Pat. No. 1,983,316 to Scott et al. granted on Dec. 4, 1934 as generally comprising a drill body or head 1 having three downwardly and inwardly inclined spaced-apart shafts 3 on which are rotatably installed the respective somewhat conically shaped and toothed cutters 4.

Since the introduction and adoption of such three-cone rotary drill bits or rock bits, other improvements or refinements have been made to increase drilling capacity or rate or useful life (i.e., improve performance) and/or to reduce production and maintenance costs. One example of such improvements is to form each shaft or leg assembly with shank and rotatable cutter or cone separately from the drill bit body and then thermally fit or assemble the legs with cones on or in the body in a secondary operation as disclosed in U.S. Pat. Nos. 8,201,646, 8,439,134, and 8,601,908 to Vezirian. Such a drill bit design and assembly method, as opposed to the unitary body and journal configuration of Scott, has a number of advantages, including facilitating larger and/or straighter or more direct mud nozzle passages for improved flow and obstruction-resistance and other geometric optimization of the leg and cone components and assemblies for improved cutting angles and mitigation against premature failure of seals, bearing surfaces, and cutting inserts. And even in other approaches involving leg-cone assemblies that are formed separately, conventional welding assembly techniques can create misalignments that again lead to premature failure, such that thermal assembly of the leg-cone assemblies within the drill body is preferable.

However, thermal assembly of the leg-cone assemblies within the drill body presents other challenges during production. Thermal fitting takes place at approximately 800° F. to 900° F. to provide an approximate 700° F. to 800° F. differential, whereas the maximum temperature for the grease and seals contained within the legs is typically in the 200° F. to 300° F. range. Thus, the close proximity of the grease and seals of each leg to the heated leg bore of the drill body makes such features subject to both conductive and radiant heat and thus susceptible to damage during thermal assembly. And so in thermal fitting of the leg-cone assemblies to the drill bit body there is a need to protect the heat sensitive components such as the grease and seals contained within the leg-cone assemblies from excessive heat during and after the thermal fitting process that could otherwise damage them.

Aspects of the present invention fulfill these needs and provide further related advantages as described in the following summary.

SUMMARY

Aspects of the present invention teach certain benefits in assembly and use which give rise to the exemplary advantages described below.

The present invention solves the problems described above by providing a method of thermal assembly of leg-cone assemblies into a rotating cone drill bit body configured for mitigating against adverse thermal effects on the seals and grease within the leg-cone assemblies. In at least one embodiment, the method includes one or more of localized leg bore heating using an induction heating coil, temporarily installing an insulative cord in the pressure equalization groove of the leg body to provide a heat barrier proximal of the pressure equalization valve, applying or installing a thermal gasket, heat blocking paste, or a thermal barrier coating on or adjacent to the leg shank shoulder for seating against the opposite distal face of the body and/or on the leg shank wall and/or bottom for seating within the leg bore, providing circulation through the mud paths for heat removal, installing a heat sink on the body pin end or about all or a portion of the body such as a fixture or jacket, with or without circulation, pre-chilling the leg-cone assemblies and/or all or part of the drill bit body, fully or partially submerging the drill bit body, any of which as appropriate before, during, and/or after thermal fitting, and in connection with any of the foregoing, forming a pocket in the distal face of the drill bit body to the depth of the leg bores to allow the leg bores to be more thermally symmetrical.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
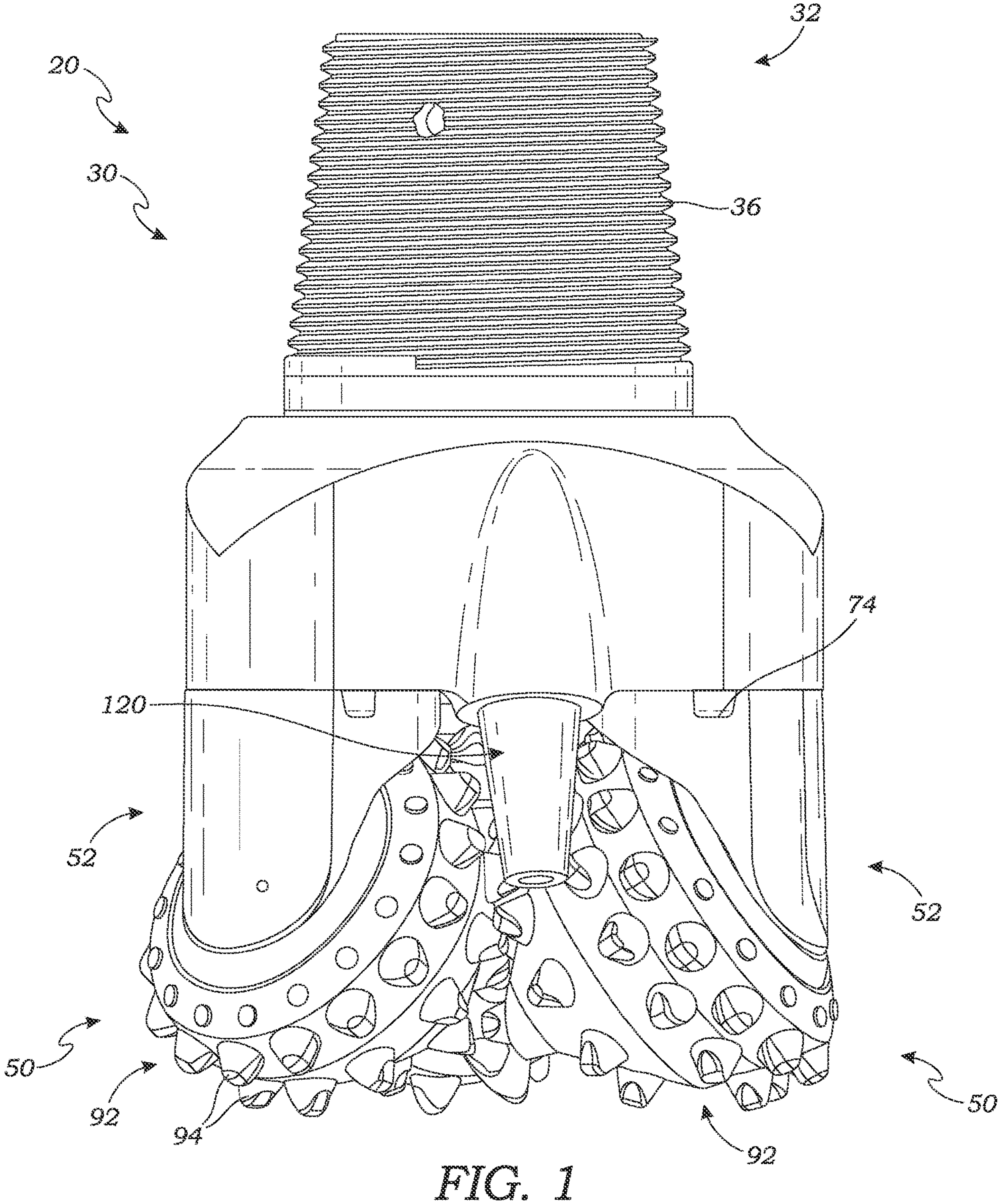
FIG. 1 (PRIOR ART)
FIG. 1 is a side view of an exemplary prior art rotating cone drill bit.

The above-described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of any structure, component, or feature according to aspects of the present invention unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are described below in detail and as appropriate are shown in the drawings. It should be understood, however, that there is no intention to limit the invention to any specific form disclosed, but on the contrary, the inventive subject matter is to cover all modifications, alternative embodiments, and equivalents falling within the scope of any appended claims.

Figure 2:
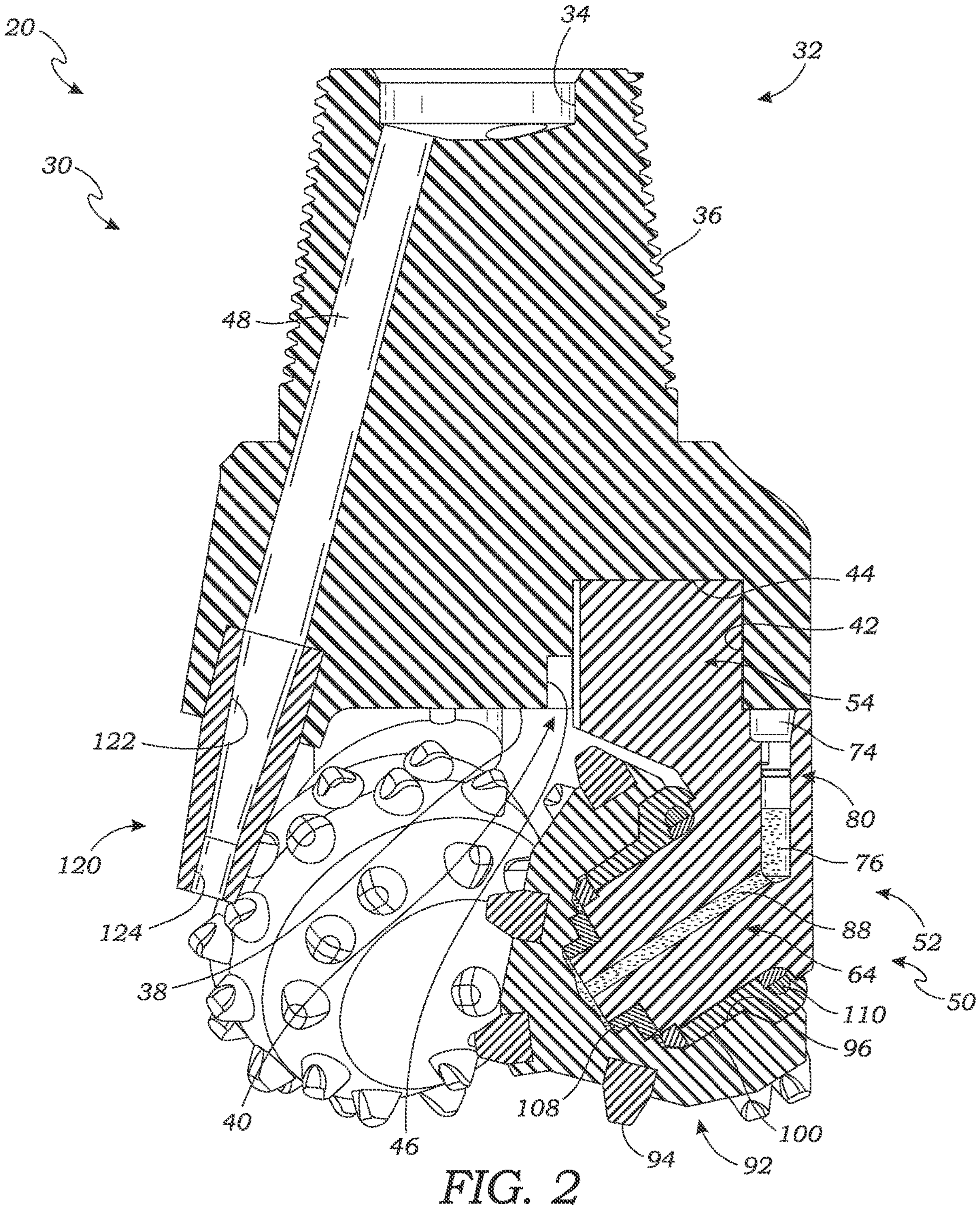
FIG. 2 (PRIOR ART)
FIG. 2 is a cross-sectional view thereof.

Turning first to FIGS. 1 and 2, and by way of further background, there is shown an exemplary conventional prior art rotating cone drill bit 20 as generally comprising a body 30, a plurality of spaced-apart leg-cone assemblies 50, and at least one mud nozzle 120. As a threshold matter it is noted that the drawings are schematic in nature and have certain details removed for simplicity, as will be noted as appropriate hereafter, and as to the cross-sectional view of FIG. 2 the section is taken through the drill bit 20 as necessary or expedient to show as fully and clearly as possible certain internal features of relevance on which basis the plane along which such section is taken or cut is not necessarily truly planar, as again explained further below.

In terms of the general construction of the exemplary rotating cone drill bit 20, then, the solid drill bit body 30 has a proximal pin end 32 and an opposite distal face 38 in which are formed spaced-apart distally-opening leg bores 40 for receipt of the distally-extending leg-cone assemblies 50 during thermal fitting. Each leg-cone assembly 50 is likewise formed having a leg body 52 with a corresponding proximally-extending shank 54 configured for receipt within a respective leg bore 40 and an opposite somewhat downwardly- and inwardly-extending journal 64 configured for rotatable receipt thereon of the respective cone body 92. To facilitate retention and smooth rotation of the cone body 92 on the leg journal 64 there are provided therebetween both a primary radial bearing 100 and an axial bearing 108. Specifically, in the exemplary drill bit 20, the cone body 92 is formed having an internal stepped bore 96 defining a profile for nesting therein of the radial and axial bearings 100, 108. The radial bearing 100 is itself formed with a proximal, radially-inwardly-opening cone seal gland 102 for receipt therein of the critical main bearing seal or cone seal 110 and is retained on the journal 64 via a distal retainer 106 positioned in a step 72 formed in the journal 64 between the radial and axial bearings 100, 108, the axial bearing 108 itself seated on a distally-facing leg journal thrust face 70. A seal riser bushing 104 is positioned proximally on the journal 64 covering the radiused transition of the journal 64 to the main portion of the leg body 52 and thus providing a flat surface for the main cone seal 110 to seat and ride on, which bushing 104 is preferably formed of carbon steel or other suitable material rather than stainless steel as a seal mating surface. Formed centrally and somewhat axially within the journal 64 is a grease communication bore 88 for supplying lubricating grease 90 to the moving parts within the leg-cone assembly 50 and particularly the radial and axial bearings 100, 108, which grease communication bore 88 intersects a vertical pressure equalization bore 76 formed in the main portion of the leg body 52 and in which is slidably and sealingly installed a pressure equalization valve 80 for somewhat "steady state" retention of the grease 90 within the assembly 50, more about which is said below. Finally regarding the leg-cone assembly 50, as known in the art, the exterior surface of the cone body 92 is formed having a plurality of cutting inserts 94 of a material such as tungsten carbide, steel, or diamond for breaking up earth and rock as the drill bit 20 rotates. Further formed in the drill bit body 30 are one or more somewhat lengthwise passageways 48 radially offset from the spaced-apart distally-opening leg bores 40 and also distally intersecting and communicating with the distal face 38 of the drill bit body 30 but further extending proximally so as to intersect and fluidly communicate with a proximal drill bit body fluid bore 34, each passageway 48 thus providing a fluid conduit from the upper or proximal end to the lower or distal end of the drill bit 20 for the supply and circulation of drilling fluid or "mud" to the working or drill bit end of the string as further facilitated by the installation of a mud nozzle 120 having a bore 122 and a distal orifice 124 that is seated within the stepped distal end of the passageway 48 adjacent to the drill bit body distal face 38. Accordingly and finally, the drill bit body 30 is formed proximally having a tapered threaded shank 36 for engagement of the drill bit 20 with a drill string via a collar (not shown) as is known in the art, thereby establishing a flow path for drilling fluid or mud down through the string and the drill bit 20 via the passageways 48 and nozzles 120. In the exemplary rotating cone drill bit 20 shown and described, there are three leg-cone assemblies 50 and related leg bores 40 radially positioned one hundred twenty degrees (120°) apart and likewise three mud nozzles 120 and related passageways 48 interposed between the leg-cone assemblies 50 and also radially positioned one hundred twenty degrees (120°) apart, though not necessarily precisely between the respective leg-cone assemblies 50 or at radial positions exactly sixty degrees (60°) from opposite leg-cone assemblies 50, hence again the appreciation that in order to take a section through the drill bit 20 that dissects both a leg-cone assembly 50 and a mud nozzle 120 and related passageway 48 as in FIG. 2, such section is not taken along a single plane. It will be further and generally appreciated that a variety of configurations of such a rotating cone drill bit 20 now known or later developed may be employed, such that the exemplary three-cone rotary drill bit or "rock bit" is to be understood as merely illustrative and non-limiting.

Figure 3:
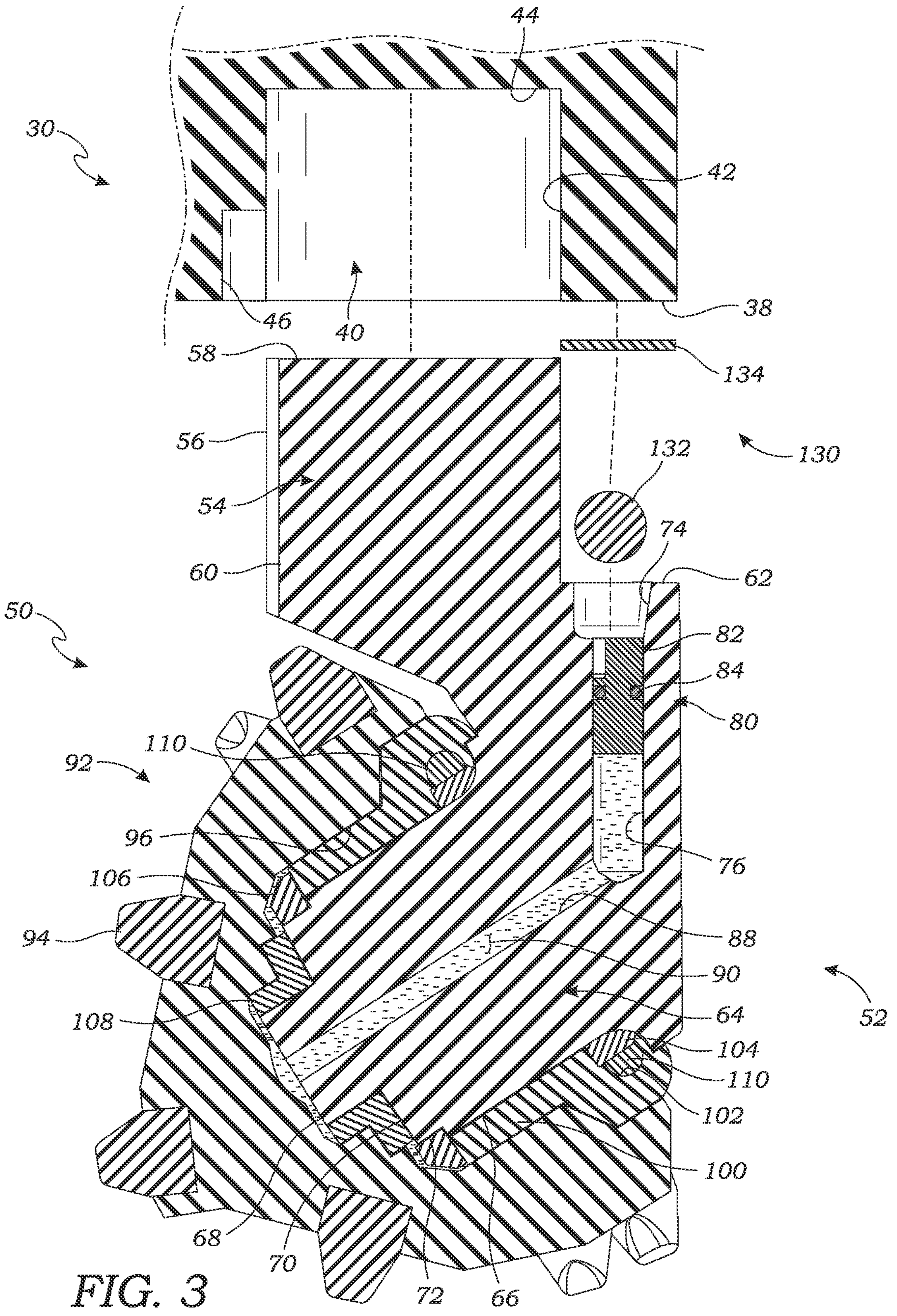
FIG. 3 is an enlarged and partial exploded cross-sectional view thereof showing exemplary heat transfer mitigation components, in accordance with at least one embodiment.

With continued reference to FIGS. 1 and 2 and now also FIG. 3 and in more detail regarding manufacturing and assembly of the exemplary rotating cone drill bit 20, first, the drill bit body 30 itself and the leg and cone bodies 52, 92 and the nozzles 120 are formed through any manufacturing method and material as appropriate to the application, whether now known or later developed, and so including but not limited to casting, forging, extruding, machining, heat-treating or sintering, 3-D printing and other additive manufacturing techniques, etc. from a variety of steels and other alloys, and whether in a single operation or multiple operations in a variety of sequences. By way of further illustration and not limitation, any such solid components can be fully heat treated steel forgings or extrusions and then machined or otherwise formed to final dimensions and features in a secondary operation. Once the leg and cone bodies 52, 92 are formed, the corresponding leg-cone assembly 50 is assembled as by first installing the main cone seal 110 within the cone seal gland 102 of the radial bearing 100 to seal the bearing environment from outside contamination, then securing the radial bearing 100 on the leg journal 64, and finally securing the cone body 52 on the radial bearing 100 as shown and described such as in U.S. Pat. Nos. 8,201,646, 8,439,134, and 8,601,908 to Vezirian. The main cone seal 110 is typically a rubber or compliant elastomer o-ring. After completing the leg-cone assembly 50, it is filled with lubricating grease 90 as by injecting such grease 90 into and through the pressure equalization bore 76 formed in the main portion of the leg body 52 and accessible via the pressure equalization groove 74 formed in the leg shank shoulder 62 and then from the pressure equalization bore 76 into and through the grease communication bore 88 and ultimately to the moving parts and sliding surfaces between the cone body stepped bore 96 and the leg journal surface 66 and end 68 and related radial and axial bearings 100, 108. The sliding pressure equalization valve 80 is then installed within the pressure equalization bore 76 also via the pressure equalization groove 74, which valve body 82 with O-ring 84 contains and protects the grease 90 and bearings 100, 108 from outside contamination in cooperation with the main cone seal 110. It will be appreciated that the close proximity of such sealing and lubricating components as the pressure equalization valve 80, grease 90, and cone seal 110 to the heated drill bit body 30 and leg bore 40 renders them subject to both conductive and radiant heat and thus damage during thermal assembly of the leg-cone assembly 50 in the drill bit body 30. Indeed, in the conventional process, the entire drill bit body 30 is heated as in an oven to on the order of 800° F. to 900° F. to cause the metal and thus the leg bores 40 to expand and thus to provide clearance for and an approximate 700° F. to 800° F. temperature differential or increase over the to-be-installed roughly ambient temperature leg-cone assemblies 50 and mud nozzles 120, which upon insertion and cooling results in an acceptable thermal fit between the mating surfaces of the drill bit body 30 and the leg-cone assemblies 50 and mud nozzles 120, even at expected well bore and mud "down hole" temperatures during standard drilling operations, though it will be appreciated that the ultimate heated temperature of the drill bit body 30, in whole or in part, for thermal fitting and thus the temperature differential achieved between it and any to-be-installed component can vary depending on a number of factors such as the corresponding materials, the amount of fit required, and the diameters of the fitted elements and may generally be in the range of 400° F. to 1,000° F. Regardless, however, the maximum temperature for the seals 80, 110 and grease 90 contained in the leg-cone assemblies 50 is typically in the 200° F. to 300° F. range, which again is adequate for operational temperatures of the drill bit 20 in use but may result in damage to the seals 80, 110 and grease 90 during the initial thermal assembly process. Accordingly, what is again needed are means for limiting or mitigating against the excess heat generated in the drill bit body 30 from transferring into the leg-cone assembly 50 and therefore safeguarding the leg-cone assemblies 50 and their seals 80, 110 and grease 90 from such excess heat generated during thermal fitting. For starters, it will be appreciated that the mud nozzles 120, though such can instead be press-fit, welded, or installed on or in the drill bit body 30 employing other means, whether now known or later developed, having no seals or grease or the like that may be damaged by excess heat, may simply be thermally fit within the stepped distal openings of the respective drill bit body passageways 48 prior to installation of the leg-cone assemblies 50 to thereby avoid any adverse thermal effects thereon, though still leaving the challenge of subsequent thermal assembly of the leg-cone assemblies 50 themselves while avoiding or limiting adverse effects on the seals 80, 110 and grease 90 as explained herein.

A first exemplary heat transfer mitigation means is the use of an induction heating coil (not shown) to locally and individually heat the leg bores 40 to minimize the amount of thermal energy used to fit the leg-cone assembly 50 into the body 30 and thereby limit heat stored in the body 30 after fitting that could then transfer to and into the leg-cone assembly(ies) 50. By way of illustration and not limitation, local heating of a single bore 40 as through an induction heating coil will again localize such heat and thereby be less likely to adversely affect already-installed leg-cone assemblies 50 but will also minimize or reduce the amount of overall heat required, such as up to approximately 900° F., to grow the bore 40 to assembly size. As such, taking the exemplary three-cone rock bit 20, and again after already installing the mud nozzles 120 via thermal assembly or otherwise, the steps would be to place an induction heating coil into a first individual leg bore 40 in the body 30, heat the first bore 40 for the desired or required amount of time or to the desired or required temperature, install a first leg-cone assembly 50 as by inserting the proximal leg shank 54 into the heated first bore 40 until the leg shank bottom 58 substantially bottoms against the leg bore bottom 44 and/or the leg shank shoulder 62 substantially bottoms or seats against the body distal face 38, and then cool off the entire assembly, which process would then simply be repeated for the second and third individual leg bores 40 and respective leg-cone assemblies 50. It is again noted that by installing one leg-cone assembly 50 at a time and cooling the assembly after each thermal fit installation, the thermal effects on the overall drill bit assembly are further minimized. Relatedly, it is preferable after each such separate thermal assembly step that the overall assembly be relatively quickly cooled to further mitigate against heat transfer into the leg-cone assemblies 50, more about which is said below. As a brief aside, it is noted that as each leg-cone assembly 50 is inserted into the respective heated and expanded leg bore 40, a guide pin (not shown) may be employed as by being installed in the adjacent leg bore cutout 46 and then slidably engaging the corresponding longitudinal leg shank groove 60 along the guide pin as the leg shank 54 is inserted proximally, such guide pin then serving to axially align and rotationally index the leg-cone assembly 50 relative to the leg bore 40 and thus the drill bit body 30 for "true geometry" assembly in producing the finished rotary drill bit 20, as also disclosed in U.S. Pat. Nos. 8,201,646, 8,439,134, and 8,601,908 to Vezirian.

Figure 5:
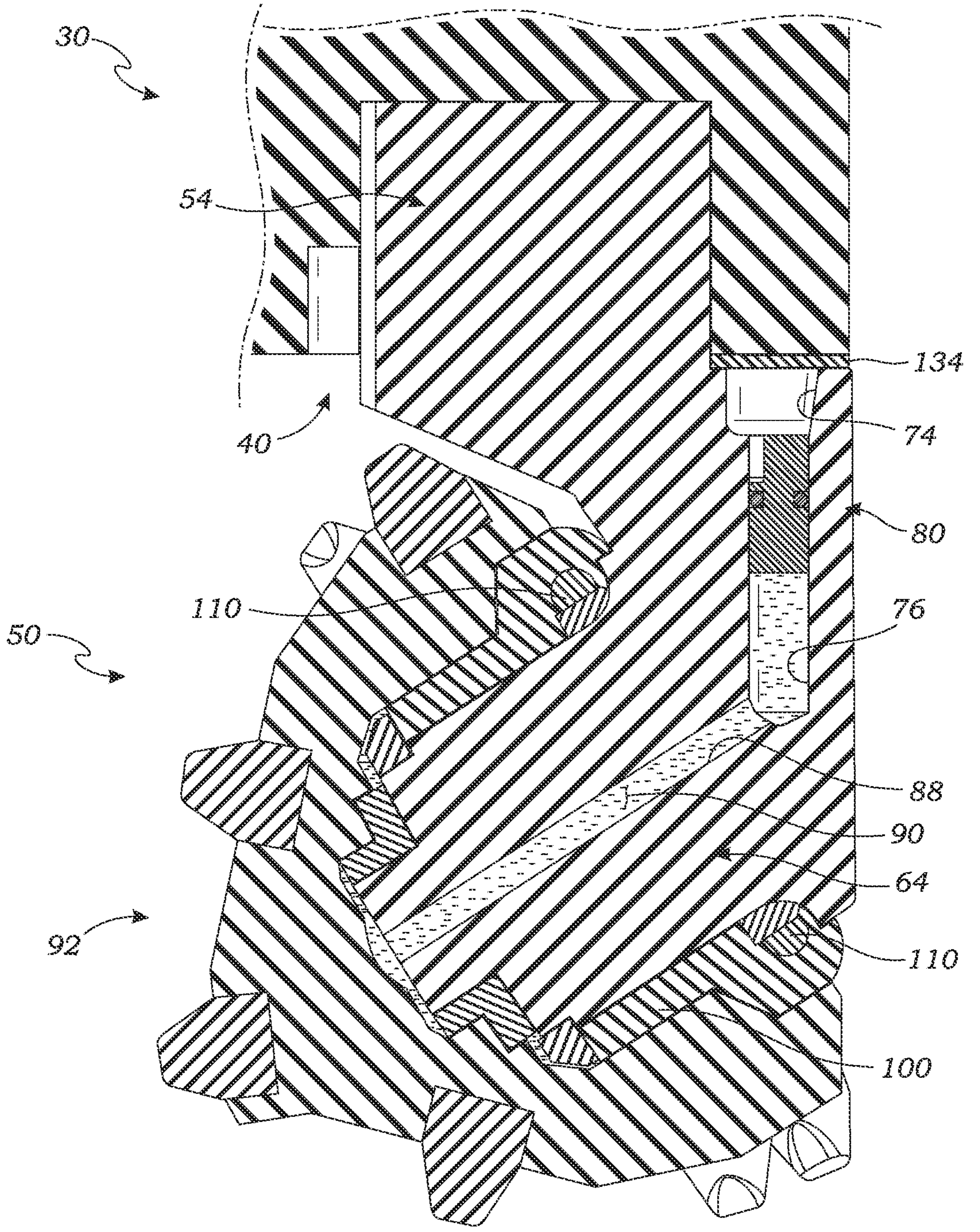
FIG. 5 is an enlarged and partial assembled cross-sectional view thereof showing the exemplary heat transfer mitigation components in a second operational mode, in accordance with at least one embodiment.
Figure 6:
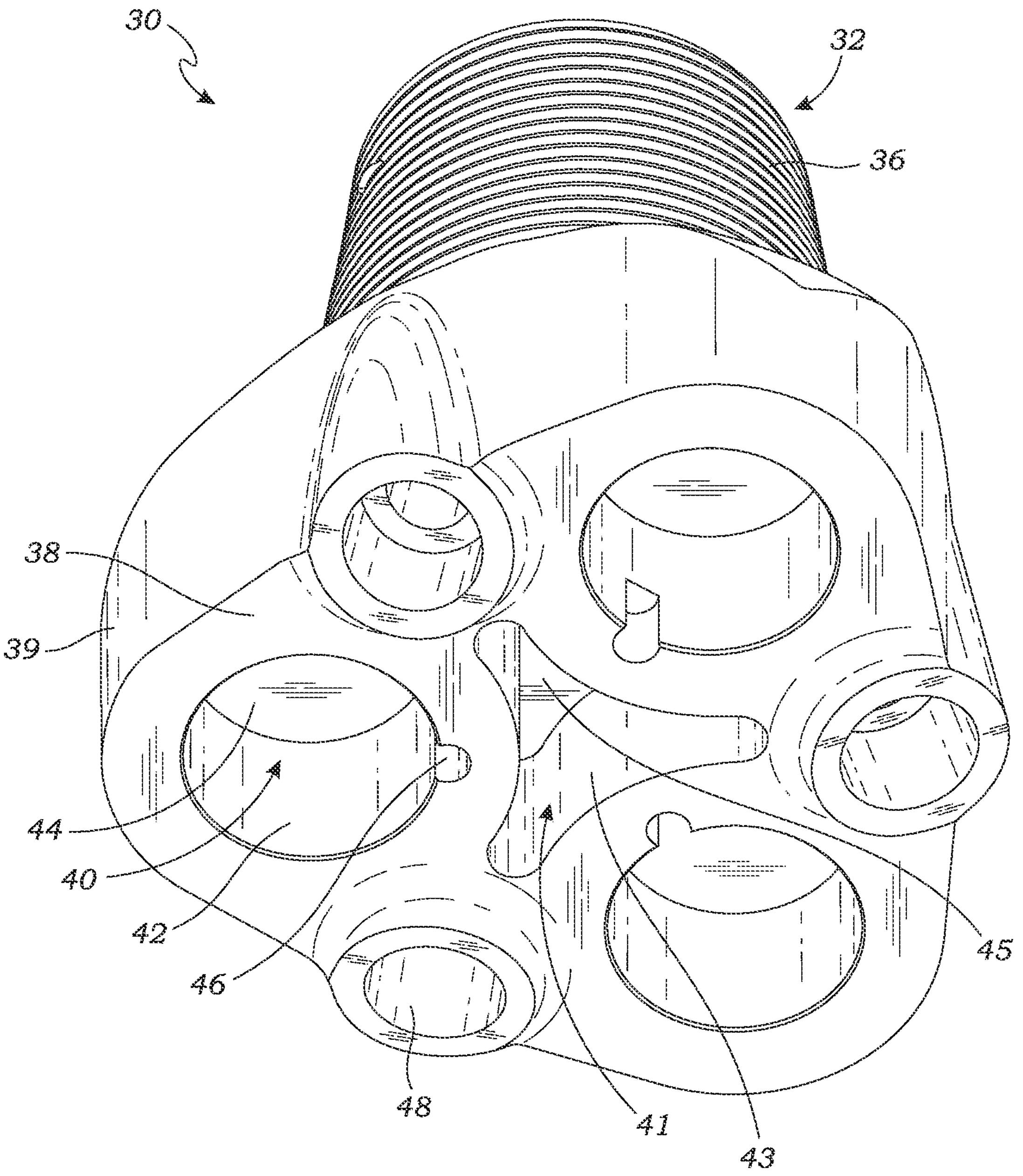
FIG. 6 is a perspective view of an improved drill bit body having an exemplary heat transfer mitigation feature, in accordance with at least one embodiment.
Figure 7:
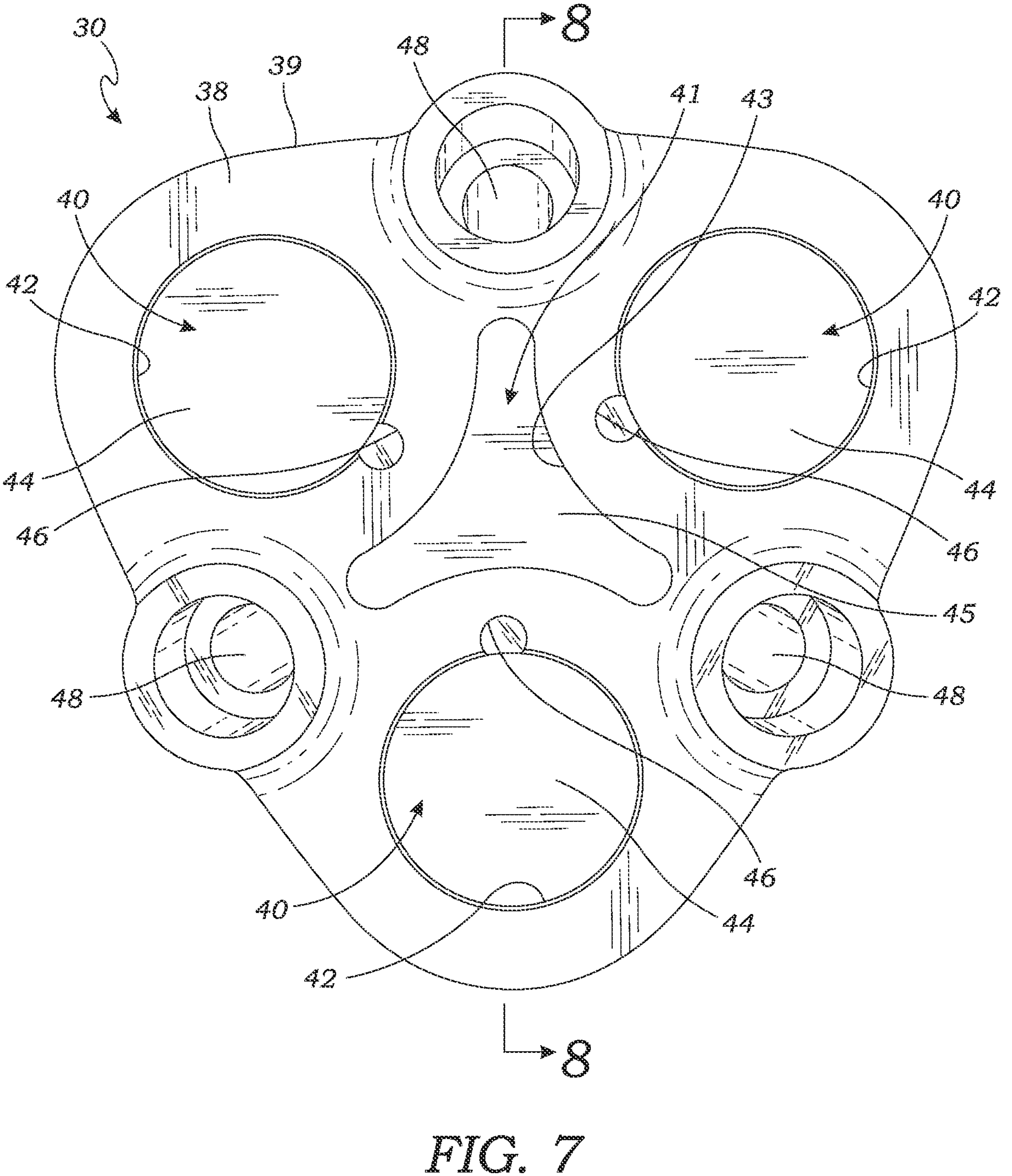
FIG. 7 is a bottom view thereof, in accordance with at least one embodiment.
Figure 8:
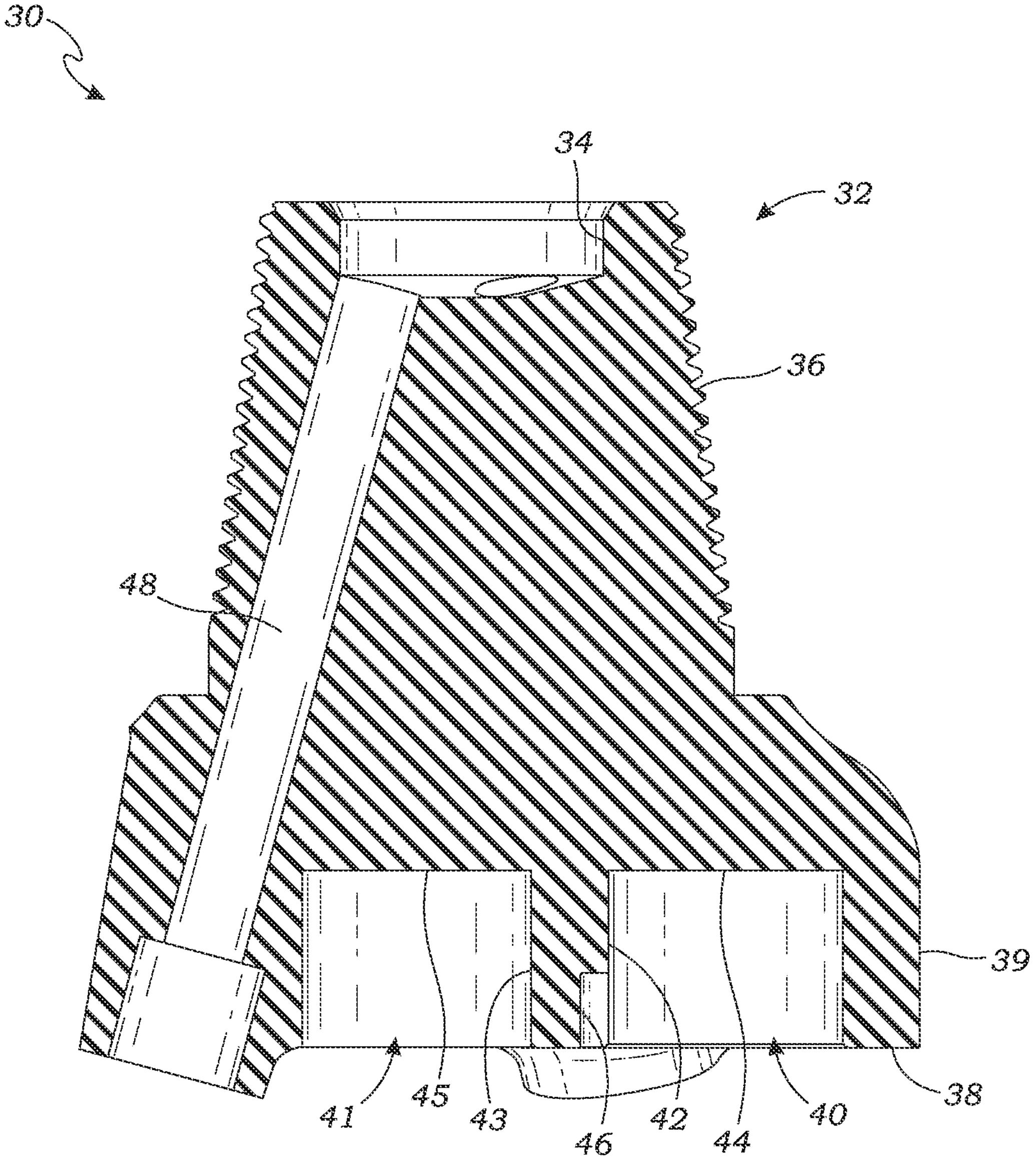
FIG. 8 is a cross-sectional view thereof taken along line 8-8 of FIG. 7, in accordance with at least one embodiment.

Referring to FIGS. 6-8, there are shown various views of an exemplary improved drill bit body 30 having a somewhat triangular pocket 41 formed substantially centrally within the distal face 38 of the body 30 to remove excess material to the depth of the leg bores 40 so as to allow the leg bores 40 to be more thermally symmetrical, the pocket 41 thus serving as another feature mitigating against adverse thermal effects during thermal assembly of the leg-cone assemblies 50 (FIGS. 3-5) into a rotating cone drill bit body 30 as shown and described herein in an illustrative embodiment. As shown, the pocket 41 is configured having an appropriate shape such that the amount of material or wall thickness about the full circumference or perimeter of each leg bore 40 is somewhat constant. In the exemplary rotating cone drill bit 20 (FIGS. 1 and 2) having three leg-cone assemblies 50 and related leg bores 40 spaced evenly and symmetrically about the drill bit body 30, thus at radial or angular positions approximately one hundred-twenty degrees (120°) apart, it follows that the pocket 41 is thus somewhat triangular in shape positioned somewhat centrally within the distal face 38 of the drill bit body 30 among and between the leg bores 40 as well as the mud passageways 48. As best seen in FIG. 7, the pocket 41 has a profile or pocket wall 43 with three rounded points or corners oriented substantially toward the three mud passageways 48 and three "sides" that are each curved to somewhat match or correspond to the curvature of the respective adjacent leg bore 40. And with the pocket 41 sized such that the material thickness of the drill bit body 30 interiorly between the pocket wall 43 and the leg bore wall 42 is somewhat equivalent to the material thickness exteriorly between the leg bore wall 42 and the outside or outer surface 39 of the drill bit body 30 at least at its smallest or thinnest section, it follows once again that the material thickness about the entire leg bore 40 is thus somewhat uniform, rendering the leg bores 40 relatively more thermally symmetrical, not accounting for the small leg bore cutouts 46 that are not even full depth. And once again, as best seen in FIG. 8, the pocket 41 is in the exemplary embodiment formed to the same depth as the leg bores 40 such that the pocket bottom 45 is substantially coplanar with the leg bore bottoms 44, further contributing to the thermal symmetry of each leg bore 40, or essentially a roughly comparable mass of material of the drill bit body 30 about the circumference of each leg bore 40. Those skilled in the art will appreciate that other shapes and sizes of the pocket 41 may be employed beyond that shown and described without departing from the spirit and scope of the invention, including the pocket 41 being deeper or shallower than the leg bores 40 in certain contexts or applications, such that the exemplary pocket 41 is to be understood as merely illustrative of aspects of the present invention and non-limiting. Even so, in a preferred embodiment, the pocket 41 will have an appropriate shape to provide a substantially consistent wall thickness of the drill bit body 30 about each leg bore 40 down to the depth of each leg bore 40. Once more, in forming the pocket 41 within the drill bit body 30, any appropriate manufacturing method may be employed, whether now known or later developed, and so including but not limited to casting, forging, extruding, machining, sintering, 3-D printing and other additive manufacturing techniques, etc.

Figure 4:
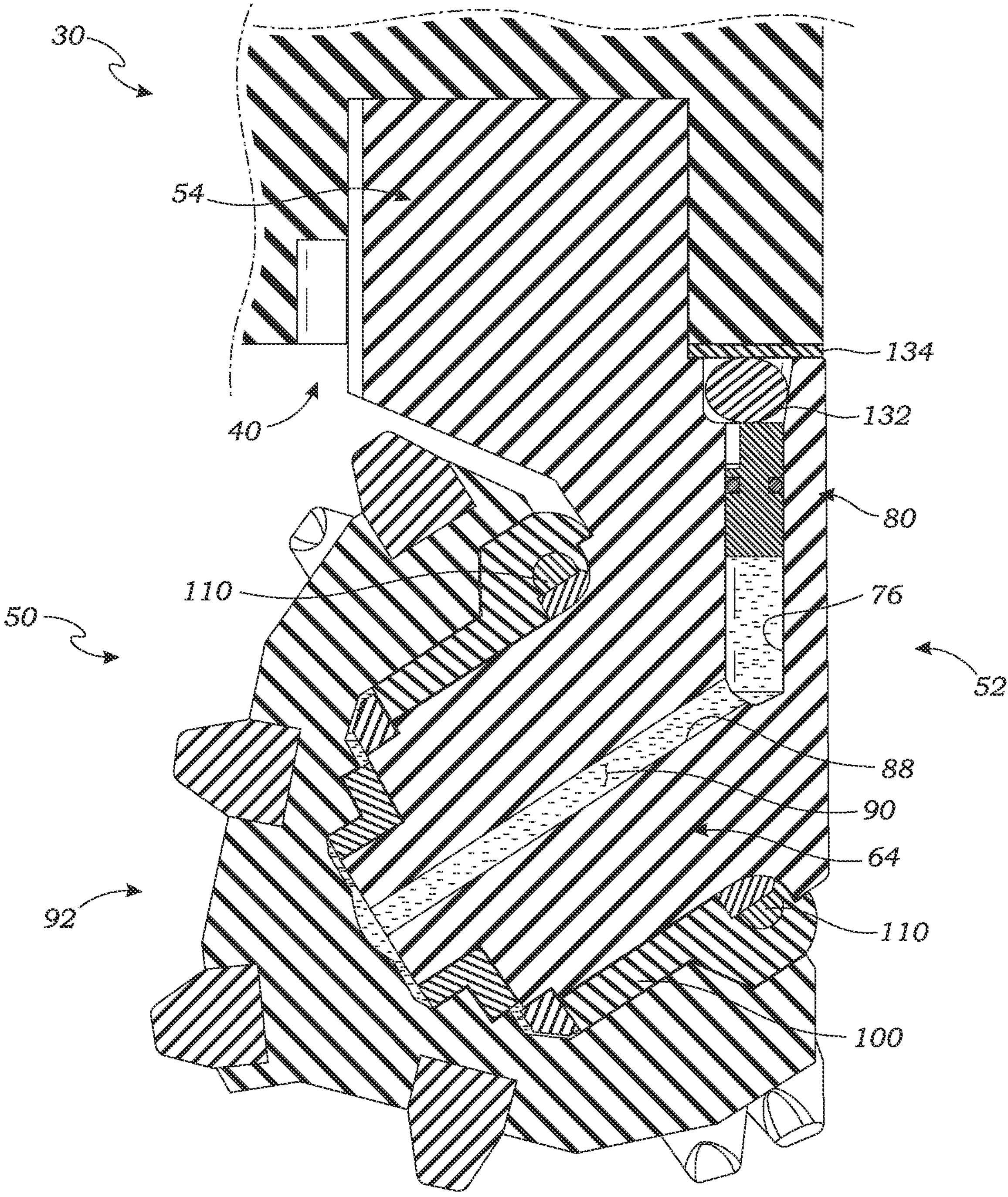
FIG. 4 is an enlarged and partial assembled cross-sectional view thereof showing the exemplary heat transfer mitigation components in a first operational mode, in accordance with at least one embodiment.

Furthermore, and with reference again to FIG. 3, as an additional means of heat transfer mitigation, one or more heat transfer mitigation component 130 may be employed between the leg-cone assembly 50 and the heated leg bore 40 and drill bit body 30 as an insulative material or physical thermal barrier. It is noted that the floating pressure equalization valve 80 is physically closest or most proximate of any of the susceptible components to the heated leg bore 40 and drill bit body 30 when the leg-cone assembly 50 is inserted, rendering the pressure equalization valve 80 particularly susceptible to thermal effects and damage due to excessive heat. The pressure equalization valve 80 generally comprises a valve body 82 with o-ring 84 slidably and sealingly installed within the pressure equalization bore 76, and though not shown, the pressure equalization valve 80 may further include an internal relief valve that serves to bleed off extra grease and/or air pressure if the pressure change within the assembly is too great to be compensated by movement of the pressure equalization valve 80 within the pressure equalization bore 76 alone, even with relatively long travel, again as shown and described in U.S. Pat. Nos. 8,201,646, 8,439,134, and 8,601,908 to Vezirian, any of which internal and other relief valves and features will again potentially be particularly susceptible to excess heat and adverse thermal effects. Accordingly, it is again proposed that at least one heat transfer mitigation component 130 be employed between the leg-cone assembly 50 and the heated leg bore 40 and drill bit body 30. As shown, one such component 130 is specifically a insulative or thermally relatively non-conductive material in the form of a cord 132 that is inserted along the pressure equalization groove 74 so as to effectively block or seal the pressure equalization bore 76 and related pressure equalization valve 80 below from the heated drill bit body 30 and specifically distal face 38 above. In one exemplary embodiment, such heat transfer mitigation cord 132 is made from a flame-resistant meta-aramid material such as manufactured and sold by DuPont under the brand name Nomex®, though it will be appreciated that a wide variety of other heat resistant, insulative materials, whether now known or later developed, may be employed, including but not limited to ceramic block(s) or tube(s) or other materials that have relatively low thermal conductivity. Those skilled in the art will appreciate that any such material or heat transfer mitigation component 130, such as the cord 132 for example, may be sized and configured to substantially fill the pressure equalization groove 74 so as to block or minimize heat transfer, specifically radiant heat, toward or into the pressure equalization valve 80. And as shown in FIGS. 4 and 5, while such a cord 132 or other material inserted within the pressure equalization groove 74 may remain during thermal assembly and any subsequent cooling step (FIG. 4), such can then easily be removed once the assembly has cooled and it is safe to do so (FIG. 5) to then reopen the pressure equalization groove 74 so that the pressure equalization valve 80 can perform its function of equalizing pressure between the internal regions of the drill bit 30 and particularly its leg-cone assemblies 50 and the outside drilling environment even in the event of deep hole drilling. Instead of or in addition to the illustrated heat transfer mitigation cord 132 or the like placed within the pressure equalization groove 74, a flat or contoured thermally low conductive gasket 134 may be positioned between the flat mating surfaces of the drill bit distal surface 38 and the proximally-facing shoulder 62 of the leg shank 54 essentially directly over and adjacent to the pressure equalization groove 74 so as to again block or minimize heat transfer, particularly radiant heat, toward or into the pressure equalization valve 80. And unlike the cord 132, as again shown in the assembled views of FIGS. 4 and 5, the heat transfer mitigation gasket 134 would then simply remain within the assembled drill bit 30 post-installation of the leg-cone assemblies 50. It will again be appreciated that other materials now known or later developed that may serve as a temporary or permanent thermal barrier may be employed on mating surfaces on or between the drill bit body 30 and the leg-cone assembly(ies) 50 so as to mitigate against heat transfer and thus serve as the heat transfer mitigation component 130, in whole or in part, such as heat blocking paste or a thermal barrier coating (not shown) on the same mating surfaces as for the gasket 134 and/or even on the leg shank 54, and specifically the wall 56 and bottom 58 thereof.

Still other exemplary heat transfer mitigation means include pre-chilling the leg-cone assembly(ies) 50 to below ambient but above the critical temperature (i.e., freezing or phase change temperature) of the grease 90 and seals 80, 110 prior to installation in the drill bit body 30 to further reduce the possibility of damage to the seals 80, 110 or grease 90 from excessive heat. And by obtaining part of the thermal differential required for thermal assembly by cooling the leg-cone assembly 50 and even shrinking the leg shank 54, the required heating or elevated temperature then of the leg bore 40 in the drill bit body 30 is correspondingly reduced, which would thus reduce the overall amount of heat required that must then be mitigated. Relatedly, it is also possible to chill the remaining bit body 30 (i.e., the portion of the body 30 other than the locally heated leg bore 40 as through an induction heating coil as described above) before, during, and/or after installation of the leg-cone assembly(ies) 50 to remove extra heat. Since thermal energy, or heat, naturally flows in one direction only, from hot toward cold, by cooling or chilling portions of the drill bit body 30 opposite of or away from the leg bore 40 and thus the leg-cone assembly 50, localized heat will thus also tend to travel toward the proximal portions of the body 30 rather than toward the leg-cone assembly 50, with the mass of the body 30 thus effectively functioning as a heat sink, particularly in connection with heat transfer by conduction and radiation as here. By way of still further illustration and not limitation, a number of other related means are possible according to aspects of the present invention for cooling either the drill bit body 30 and/or the leg-cone assembly(ies) 50 during and/or after assembly, including but not limited to a separate heat sink, whether chilled or ambient, either as a physical component (not shown) threaded to the tapered threaded shank 36 at the pin end 32 of the bit body 30 or removably formed on or about the body 30 such as a form-fitting copper jacket (not shown) or as a bath, again whether chilled or ambient, in which the pin end 32 is at least partially submerged, in either case to draw the unwanted heat away from the leg-cone assembly(ies) 50, or any combination thereof, such as dunking the threaded heat sink or copper jacket immediately after fitting the leg-cone assembly 50 and/or providing any such heat sink with integral fluid passages for circulation of water or other fluid, again whether ambient or chilled, to quickly remove heat. Of course, after thermal fitting, the entire assembly could then be dunked or submerged for rapid cooling, even in a bath that is also above ambient so long as below the temperature of the heated drill bit body 30. Indeed, in at least one exemplary embodiment, the bit body 30 will be held in a fixture (not shown) during thermal fit assembly for rigidity, which fixture could also serve as a heat sink and also include a dunk tank and or other features (not shown); for example, the portion of the fixture that holds the body 30 as by threadably engaging the tapered threaded shank 36 at the pin end 32 of the bit body 30 could be made of copper or other thermally conductive material and positioned at or adjacent to a tank so that at least a portion of the fixture along with the bit assembly could be immediately lowered into the tank of water or other fluid after thermal fitting. Furthermore, yet another exemplary heat transfer mitigation means involves circulating water or other fluid through the interior passages of the drill bit body 30 and specifically the passageways 48 and mud nozzles 120 (i.e., through the mud path), from the mud receiver bore 34 at the proximal pin end 32 of the bit body 30 and out the ends of the nozzles 120 during and/or after fitting (or in a reverse direction) to quickly draw the heat away from the leg-cone assemblies 50 and out of the body 30, which would necessitate the use of tubes to be temporarily installed over the mud nozzles 120 to prevent any water or other fluid from coming into contact with the heated exterior areas, which could cause damage or injury from the steam generated. Instead of or in addition to any such cooling means as involving submersion of the drill bit body 30, in whole or in part, within a bath or the like or the internal flow of cooling fluid such as water through the drill bit passageways 48, a flow or spray of water or other cooling fluid over the outside of at least a portion of the drill bit body 30 as through a hose, nozzle, or waterfall-type cascade may be employed as again causing conductive heat transfer away from the body 30 and thus the heat sensitive components within the leg-cone assembly(ies) 50. Those skilled in the art will appreciate that employing any such cooling means wherein the cooling fluid such as water is applied to the locally heated drill bit body 30 in areas away from the hottest regions, such as over the proximal pin end 32 and not the distal portion of the drill bit body 30 or the leg-cone assembly(ies) 50, will serve to avoid or minimize hot steam production in the cooling or quenching process. Once again, it will be appreciated by those skilled in the art that any appropriate combination of any such heat transfer mitigation means or components, whether now known or later developed, may be employed according to aspects of the present invention without departing from its spirit and scope, such that the various heat transfer mitigation means or components described herein and in whatever combination are to be understood as illustrative and non-limiting. By way of further illustration and not limitation, such a system and method for thermal assembly of leg-cone assemblies 50 into a rotating cone drill bit body 30 may entail forming a pocket 41 in the distal end or face 38 of the drill bit body 30 somewhat symmetrically about the leg bores 40, localized heating of each leg bore 40 using an induction heating coil, partially submerging the body 30 while also providing circulation through the mud paths 48, 120, and with respect to each leg bore 40 temporarily installing an insulative cord 132 in the pressure equalization groove 74 of the leg body 52 and applying heat blocking paste or installing a thermal gasket 134 on or adjacent to the proximally-facing leg shank shoulder 62 for seating against the opposite distal face 38 of the body 30 about the respective leg bore 40.

In closing, regarding the exemplary embodiments of the present invention as shown and described herein, it will be appreciated that a method of thermal assembly of leg-cone assemblies into a rotating cone drill bit body is disclosed and configured for mitigating against adverse thermal effects on the seals and grease within the leg-cone assemblies. Because the principles of the invention may be practiced in a number of configurations beyond those shown and described, it is to be understood that the invention is not in any way limited by the exemplary embodiments and is able to take numerous forms or combinations without departing from the spirit and scope of the invention. It will also be appreciated by those skilled in the art that the present invention is not limited to the particular geometries and materials of construction disclosed but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components, properties such as dimensions, temperature, conductivity, and so forth, used to describe and claim certain embodiments of the inventive subject matter are to be understood as being modified in some instances by terms such as "about," "approximately," or "roughly." Accordingly, in some embodiments, the numerical parameters set forth in the written description and any attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc. —for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with any appended claims here or in any patent application claiming the benefit hereof, and it is made clear that the inventor(s) believe that the claimed subject matter is the invention.

What is claimed is:

1. A method of thermal assembly of multiple leg-cone assemblies within multiple respective distally-opening leg bores of a drill bit body of a rotating cone drill bit, each leg-cone assembly having a leg body with a proximal leg shank for selective receipt within the respective leg bore, the method comprising the steps of:

(a) forming a pocket in the drill bit body symmetrically about the leg bores;
(b) heating a single leg bore;
(c) inserting the leg shank of the leg-cone assembly into the heated leg bore;
(d) cooling the drill bit; and
(e) repeating steps (b)-(d) in separately assembling each leg-cone assembly within the respective leg bore, thereby mitigating against adverse thermal effects on seals or grease within the leg-cone assemblies.

2. The method of claim 1, wherein step (a) of forming a pocket in the drill bit body comprises shaping the pocket within a distal face of the drill bit body such that a remaining interior material thickness of the drill bit body between the pocket and each leg bore is substantially uniform and approximates an exterior material thickness between each leg bore and an outer surface of the drill bit body, whereby each leg bore is relatively thermally symmetrical.

3. The method of claim 2, wherein the pocket has a pocket wall that defines a relatively triangular profile.

4. The method of claim 3, wherein the drill bit body comprises three leg bores each having a curved leg bore wall, and further wherein the pocket wall has three sides each curved approximately corresponding to the respective curved leg bore wall.

5. The method of claim 4, wherein the pocket wall has three rounded corners oriented toward respective three mud passageways formed in the drill bit body, each side of the pocket wall interconnecting adjacent corners.

6. The method of claim 2, wherein step (a) of forming a pocket in the drill bit body further comprises shaping the pocket to have a pocket depth from the distal face that is as great or greater than a bore depth of each leg bore.

7. The method of claim 6, wherein the pocket has a pocket bottom and each leg bore has a leg bore bottom, and further wherein the pocket bottom and the leg bore bottoms are parallel to the distal face.

8. The method of claim 7, wherein the pocket bottom and the leg bore bottoms are coplanar.

9. The method of claim 1, wherein step (b) of heating a single leg bore is performed using an induction heating coil.

10. The method of claim 1, wherein step (b) of heating a single leg bore involves bringing the leg bore up to a temperature of at least approximately 800° F.

11. The method of claim 1, comprising, prior to or concurrently with step (b) of heating a single leg bore, the further step of pre-chilling one or both of the respective leg-cone assembly and a proximal pin end of the drill bit body, thereby obtaining part of the thermal differential required for thermal assembly at step (c) of inserting the leg shank of the leg-cone assembly into the heated leg bore while reducing the overall heating of the leg bore.

12. The method of claim 1, comprising, prior to or concurrently with step (b) of heating a single leg bore, the further step of removably applying a heat sink material at least partially about a proximal pin end of the drill bit body opposite of the leg bores.

13. The method of claim 12, wherein the heat sink material is selected from the group consisting of a copper jacket and a cooling fluid bath.

14. The method of claim 12, wherein the heat sink material is configured for selectively engaging a tapered threaded shank formed at the proximal pin end of the drill bit body for mounting and positioning the drill bit body during steps (b)-(d).

15. The method of claim 1, comprising, prior to at least step (c) of inserting the leg shank of the leg-cone assembly into the heated leg bore, the further step of positioning a heat transfer mitigation component on the leg-cone assembly adjacent to one or more of a proximally-opening pressure equalization groove formed in a proximally-facing leg shank shoulder, a proximally-facing leg shank bottom, and a leg shank wall.

16. The method of claim 15, wherein the heat transfer mitigation component is a cord positioned within the pressure equalization groove.

17. The method of claim 16, comprising, after step (d) of cooling the drill bit, the further step of removing the cord from the pressure equalization groove.

18. The method of claim 15, wherein the heat transfer mitigation component is a gasket positioned on the leg shank shoulder over the pressure equalization groove.

19. The method of claim 15, wherein the heat transfer mitigation component is formed from a material selected from the group consisting of flame-resistant meta-aramid, ceramic, heat-blocking paste, and thermal barrier coating.

20. The method of claim 1, wherein step (d) of cooling the drill bit comprises one or more of at least partially submerging the drill bit body within a cooling fluid, circulating cooling fluid through passageways formed in the drill bit body, and a flow of cooling fluid over at least a portion of an outer surface of the drill bit body, whereby localized heat in the respective leg bore will tend to travel toward proximal portions of the drill bit body rather than toward the respective leg-cone assembly.

* * * * *